United States Patent [19]

Van Trigt

[11] Patent Number: 4,862,356
[45] Date of Patent: Aug. 29, 1989

[54] METHOD AND DEVICE FOR SORTING OBJECTS PROVIDED WITH A PARAMETER, ACCORDING TO THE VALUE OF THIS PARAMETER

[75] Inventor: Cornelius H. P. Van Trigt, Eindhoven, Netherlands

[73] Assignee: U.S. Philips Corporation, NY, N.Y.

[21] Appl. No.: 1,307

[22] Filed: Jan. 8, 1987

[30] Foreign Application Priority Data

Jan. 9, 1986 [NL] Netherlands ............... 8600028

[51] Int. Cl.⁴ .................. G06F 7/00; G06F 7/22; G06F 7/32; G06F 7/36
[52] U.S. Cl. .................. 364/300; 364/200; 364/222.81; 364/222.9; 364/282.2
[58] Field of Search .................. 364/200, 900, 300

[56] References Cited

U.S. PATENT DOCUMENTS

| | | | |
|---|---|---|---|
| 2,983,904 | 5/1961 | Moore | 364/900 |
| 3,662,402 | 5/1972 | Bond et al. | 364/300 |
| 4,210,961 | 7/1980 | Whitlow et al. | 364/300 |
| 4,410,960 | 10/1983 | Kasuya | 364/900 |
| 4,499,555 | 2/1985 | Huang | 364/900 |
| 4,575,798 | 3/1986 | Lindstrom et al. | 364/300 |
| 4,651,301 | 3/1987 | Ballmer et al. | 364/900 |

OTHER PUBLICATIONS

P. N. Armstrong, "A Serial Sorting Machine", Computers and Electrical Engineering, vol. 9, No. 1, pp. 53-58 (1982).

Lorin, H. "Sorting and Sort Systems", Reading, Mass., Addison-Wesley Publishing Company, 1975, pp. 126-128, 177-193, A-24 to A-26, A-68 to A-72.

Primary Examiner—Raulfe B. Zache
Assistant Examiner—Robert B. Harrell
Attorney, Agent, or Firm—Thomas A. Briody; Jack E. Haken; Anne E. Barschall

[57] ABSTRACT

In sorting an input file on the basis of parameter values of the objects, monotonically varying chains of the objects are formed first. In an inspection phase these chains are selected from which the selection objects will be found as k firsts of the selection objects in the output file, as well as the following selection object. Next, all the objects which on the basis of the parameter value need not function later than the $(k+1)^{th}$ selection object are incorporated in a sub-file, transported to a direct sorting machine and, if necessary, the chain formation is then repeated.

4 Claims, 6 Drawing Sheets

$$(1): \{a(j+1) < a(j) \land f(j) = 1\}$$

$$\lor \{a(j) < a(j+1) \land f(j) = 0\}$$

$$\lor \; s(j) \geq \beta L$$

$$(2) \left[ \{a(j+1) \leq a(j) \land f(j) = 0\} \right.$$

$$\left. \lor \{a(j) \leq a(j+1) \land f(j) = 1\} \right]$$

$$\land \; s(j) < \beta L$$

FIG. 6c

METHOD AND DEVICE FOR SORTING OBJECTS PROVIDED WITH A PARAMETER, ACCORDING TO THE VALUE OF THIS PARAMETER

BACKGROUND OF THE INVENTION

The invention relates to a method for sorting objects, each of which is provided with a parameter, according to the value of this parameter. A device for performing such a method is known from the article by P.N Armstrong and M. Rem, A serial sorting machine, Comp. and Electr. Eng., Vol. 9, 1982, 53–58. After sorting, the objects constitute an output file, while the value of the parameter in the output file varies monotonically decreasing, monotonically rising, monotonically decreasing, monotonically non-decreasing. Only the last case is considered below, but that is not a factual limitation. It is clear that sorting according to a decreasing value of the parameter amounts to the same as sorting according to an increasing value on the complement of the parameter. In the latter case, the parameter is therefore implicitly given. In particular, the invention relates to a method for sorting objects, each of which is provided with a parameter, according to the value of this parameter, the said objects being successively presented in an input file and the said sorting taking place by presenting the objects to a direct sorting machine which offers space for a sub-file of at least a pre-determined number of objects. The known method can be used if the number of objects in the input file does not exceed a pre-determined upper limit determined by the equipment. If a larger number of objects is presented no sorting can take place. In the case of a larger input file it is possible to divide this into sub-files, to sort each sub-file separately, and to combined (merge) the sorted sub-files. If during this combination an object that forms part of a particular sub-file must, however, be placed between two objects which form part of another sub-file (more complicated cases are equally conceivable) then this requires either a large, rapid memory with random access, or it leads to slow-working solutions with serially accessible memories such as magnetic discs. If, on the other hand, a complex merging of the sub-files as referred to above need not take place, the sub-files can be combined in a simple manner. In the case of an increasing value of the parameter an object of a following sub-file must then never have a smaller parameter value than any object of a preceding sub-file.

SUMMARY OF THE INVENTION:

It is an object of the invention to enable an input file of an a priori random size to be sorted with a direct sorting machine which need operate simultaneously only on a relatively small number of objects, while the need to combine sub-files remains confined to placing these sub-files one behind the other as a whole, so that no object of any sub-file need be placed between objects of any other subfile. The object is achieved because the invention is characterised by the fact that the method contains the following steps:

(a) in a chain-formation phase, the comparison of the parameter value of an object with the parameter value of the preceding object in order to form a chain of objects with monotonically varying parameter values and, in the case of such a monotonically varying chain, to remember in each case the number of objects in the chain and the parameter value of the selection object of the chain, that is that object in it that within an output file to be formed will function as the first object of the objects of the relevant chain, and thus to divide the input file into a number of chains;

(b) in an inspection phase, the selection of a number (k) of parameter values of selection objects which in an output file can function as k first objects of the current selection objects, in such a way that the capacity of the direct sorting machine is sufficiently great for the objects of the chains belonging to these k selection objects, as well as the selection of the following $(k+1)^{th}$ selection object;

(c) the formation of a sub-file consisting of the objects which, on the basis of their parameter value, should function in the output file not later than the said $(k+1)^{th}$ selection object;

(d) the sorting of the above-mentioned sub-file in the direct sorting machine;

(e) the formation and sorting of subsequent sub-files in a corresponding manner;

(f) the concatenation of the sub-files formed in this way.

The invention also relates to a device for the performance of the method. Further advantageous aspects are cited in the sub-claims. Basically, other direct sorting machines than the one cited are also applicable.

BRIEF DESCRIPTION OF THE DRAWING:

The invention is further explained on the basis of some figures, first showing the sorting of a specimen file, then an exact formulation of a specimen procedure, and finally a device for performing the sorting.

FIG. 6c presents a formula for performing the sorting operation of the invention.

Figure 1:
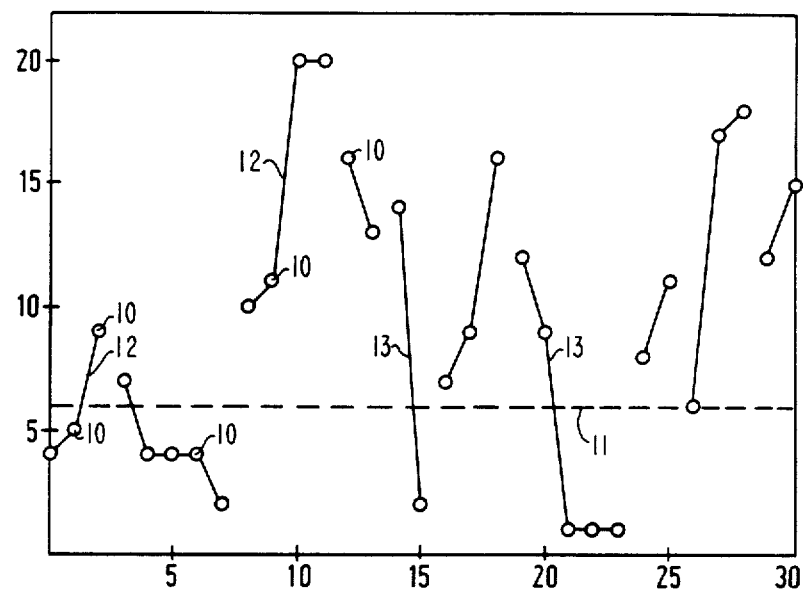
FIG. 1 shows an example of an input file.

DESCRIPTION OF THE PREFERRED EMBODIMENT:

FIG. 1 is a picture of 31 objects 10 which must be sorted. Only representative objects are numbered for convenience. The rank number (0 . . . 30) is plotted horizontally. The value of the parameter according to which sorting must take place is plotted vertically. The sorting operates on a one-dimensional parameter, but basically the objects may have several different parameters. An object may be an item of administrative data, for example, a change in a bank account (which, for example, must be sorted according to the number of the bank account). It may, for example, be an item of measuring data, while the measuring data must be sorted according to one or another parameter. In FIG. 1 each object is represented by a small circle. The objects are divided into notional chains 12, 13. The chains can be established according to different criteria. In the figure there are "increasing" chains 12 and "decreasing" chains 13. The parameter values of an "increasing"

chain constitute a "monotonically non-decreasing row". The parameter values of a "decreasing" chain constitute a "monontonically non-increasing row". Basically there are other conceivable algorithms for dividing the objects into chains. For example, a different division occurs if the chains are formed from right to left. It is also possible for a chain to break off after the last of a number of objects with the same parameter value. (If no objects occur with the same parameter value this latter case does not occur.) The formation of the above-mentioned chains takes place in a first sub-procedure, the chain formation phase. At the end of the chain formation phase it is known for each chain what object constitutes the end of the respective chain at the side of the lowest parameter. This is what is termed the selection object which, after the ultimate sorting, will act as the first object of the objects of the chain in question in the output file. In this case the selection objects are a(0), a(7), a(8), a(13), a(15), a(16), a(23), a(24), a(26) and a(29). The length of the chains is determined by the properties of the objects. If the value of the parameter satisfies a random probability distribution with respect to the parameter value of the previous object, the average length is approximately 3. In many cases this will be slightly larger and in some cases considerably larger. After the chain formation phase the following is therefore known for all chains: (1) the selection object, (2) the number of objects in the chain (=length).

Next, during the inspection procedure a number k of the smallest selection objects is determined. This number is determined by the aggregated lengths of the related chains to be taken into account in a direct sorting process, because this aggregated length must not exceed the capacity of the direct sorting machine L. In the case of chains which are longer on average this number will therefore be smaller. Basically, the determination of this k smallest selection objects can be done with a machine as described in the article by Armstrong et al. already referred to, because the number of selection objects is often considerably smaller than the total number of objects. On the other hand, this determination can be done with other mechanisms.

In the example of an embodiment, the direct sorting machine has a sorting capacity of L=15 objects. This variable has been chosen on the basis of the application. Then, for a first sub-file to be formed only the objects in the chains with the lowest selection objects are considered, the aggregated length of which chains does not exceed the variable L. A second criterion which applies is that of these chains only the objects are considered which are at least "not higher" than the lowest selection object not considered. In this example, therefore, these are the chains with the selection objects a(23), a(7), a(15) and a(0). The aggregated length of these four chains is 5+5+2+3=15. The above-mentioned criterion of "not higher" can, in turn, be replaced by the criterion "lower". The next higher selection object is a(26). For the first sub-file 14, therefore, all the objects in the relevant chains on, or below, the dashed line 11 are considered: in sequence a(0), a(1), a(4), a(5), a(6), a(7), a(15), a(21), a(22) and a(23), a total of ten. This first sub-file is shown on the left in FIG. 2 and can always be sorted by the direct sorting machine with a capacity L.

Figure 3:
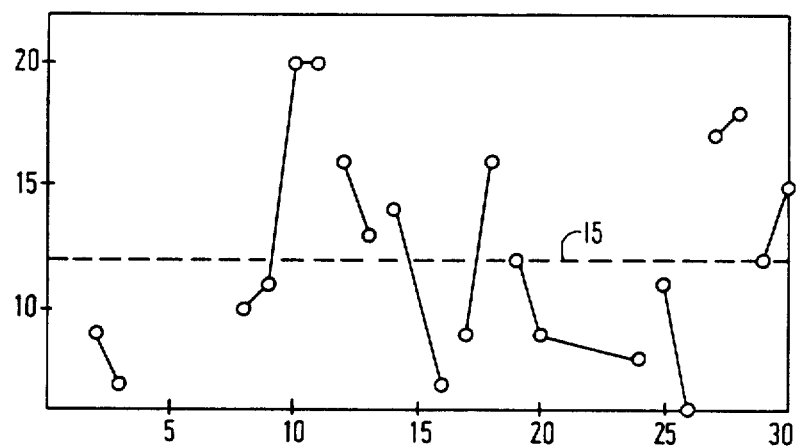
FIG. 3 shows the remaining input file after the formation of the first sub-file.

FIG. 3 shows the remaining input file after the formation of the first sub-file, in which the chain formation phase is gone through again. In this respect, the figure is still cut off at ordinate=6. The second chain formation phase can, in fact, be performed in the same way as the first chain formation phase, provided that all the objects with a parameter value of 6 or less are transferred as a sub-file to the direct sorting machine. They are then not further considered for this chain formation phase.

Next, the inspection procedure is repeated and in this respect the selection objects a(3), a(8), a(16) a(17), a(24) and a(26) prove to be the lowest at which the aggregated length would fit into the direct sorting machine. The next higher selection object is a(29). For the second sub-file, therefore, we have the objects with a parameter value which is at least equal to that of object a(26), but is not higher than that of object a(29). These are therefore, consecutively, the objects a(2), a(3), a(8), a(9), a(16), a(17), a(19), a(20), a(24), a(25) and a(26), a total of eleven. This sub-file is shown in FIG. 1 inside the second rectangle (within each sub-file the sequence is that of the numbering of FIG. 1). In FIG. 3 the cutoff threshold is again indicated by a broken line. On this broken line there now lie both an object that belongs to the second sub-file 16 and one that belongs to the third sub-file 17.

Figure 2:
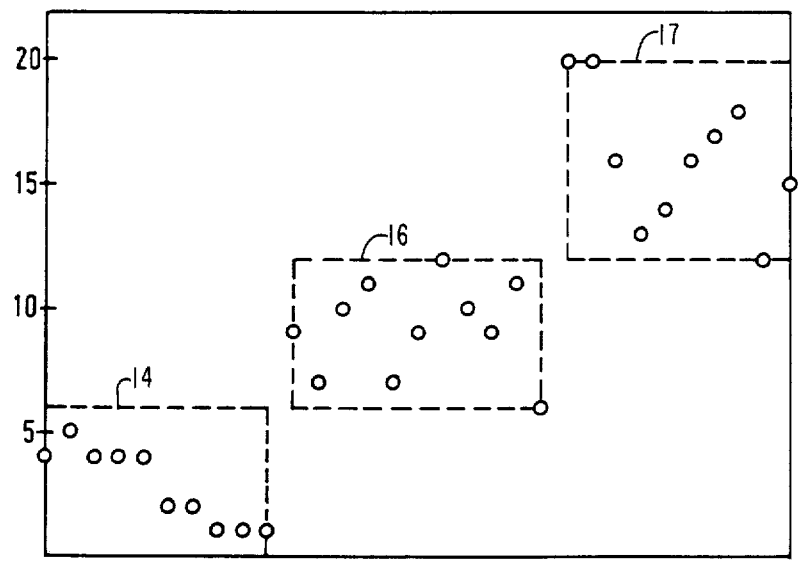
FIG. 2 shows the sub-files formed from this.
Figure 4:
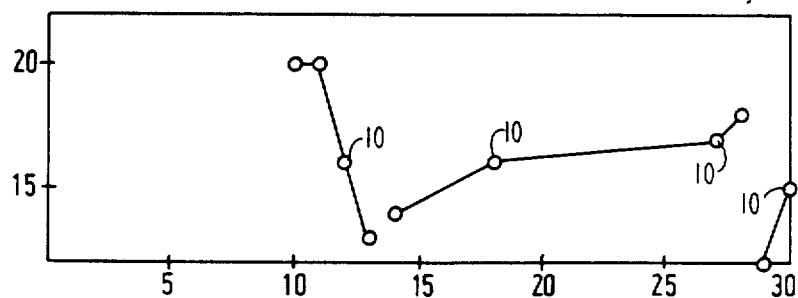
FIG. 4 shows the remaining input file from the formation of the second sub-file.
Figure 5:
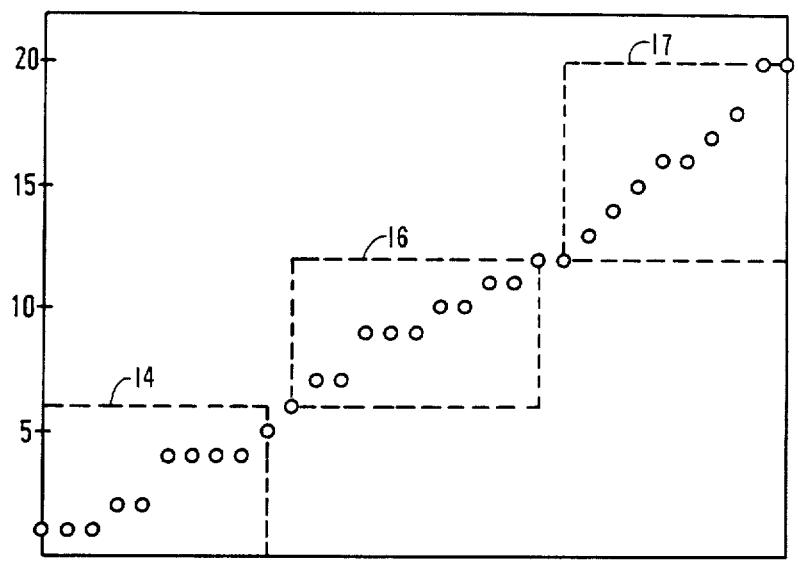
FIG. 5 shows the output file formed.

FIG. 4 shows the remaining input file after the formation of the second sub-file 16 and the related chain formation phase; in this respect the figure is cut off at a parameter value of 12: a(29). The total number of remaining objects is ten. As a result, the remaining chains can all be presented to the direct sorting machine with selection objects a(13), a(14) and a(29). FIG. 2 shows the three subfiles. FIG. 5 shows the three sub-files 14, 16, 17, concatenated after separate sorting, with the known sorting device or in some other way. As the result of the cases in which objects with the same parameter values occur, this sorting is not unambiguous and the ultimate sequence depends on the algorithm chosen. This sequence, however, always produces a monotonous variation in the parameter values.

The algorithm described can be adapted to respective possibilities. Picking out the lowest selection objects is in itself a sorting process. This can therefore be done with the sorting machine with limited capacity which is described in the article quoted. If the total number of selection objects is too great, these selection objects can be regarded as objects. Then chains are formed with these selection objects and from these chains one single sub-collection is selected in the same way as described above for the original objects.

Figure 6A:
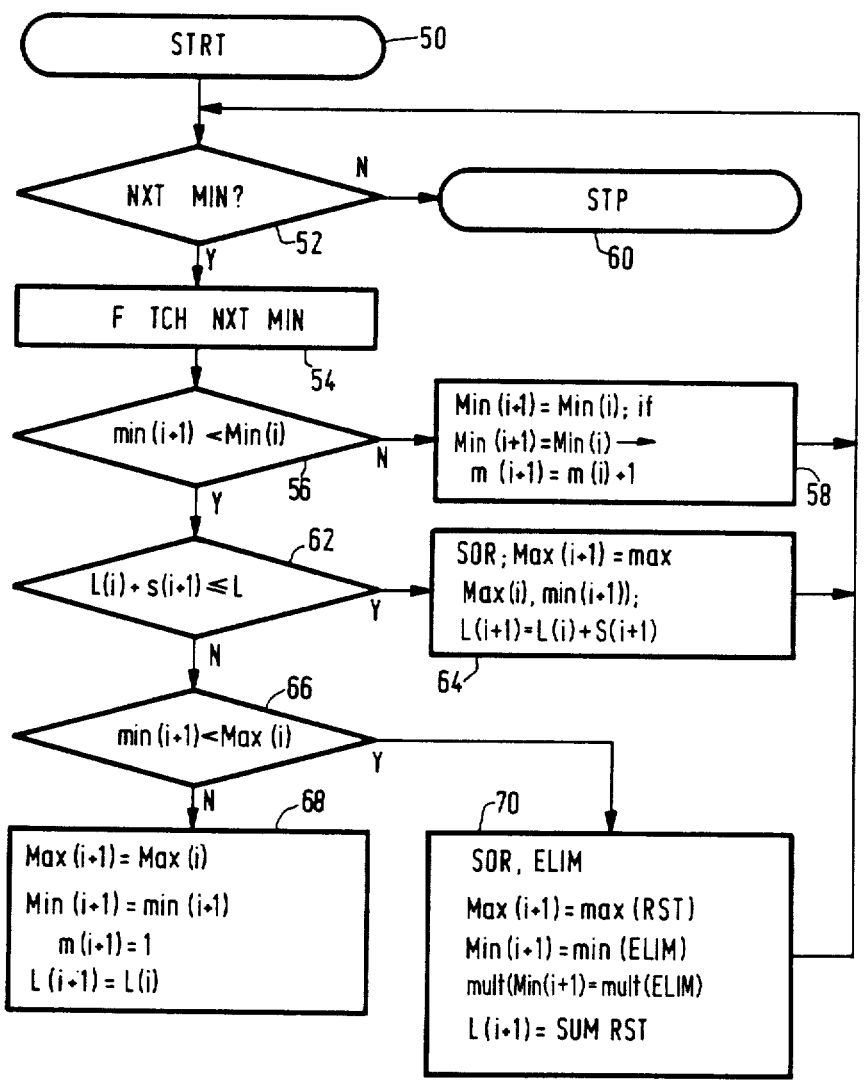
FIG. 6a is a flow diagram for the performance of the sorting operation according to the invention.
Figure 6B:
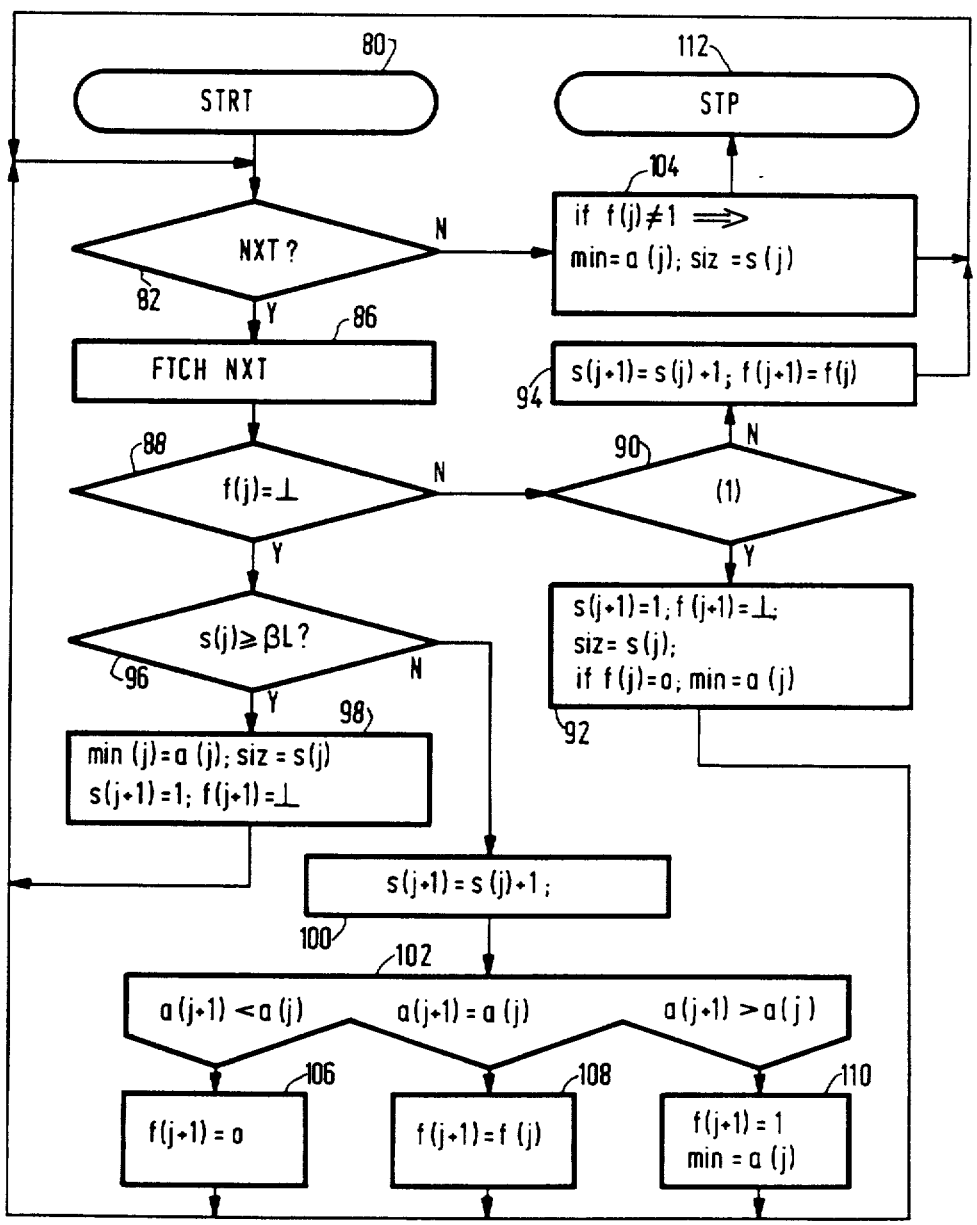
FIG. 6b is a flow diagram for the performance of the sorting operation according to the invention.

FIGS. 6a and 6b present flow diagrams for performing the sorting operation according to the invention.

FIG. 6a relates to the determination of the necessary auxiliary variables for filling the sorting machine. The initiation of the system, resetting of counters and registers, and the allocation of the necessary memory space take place in block 50. In addition, some variables are declared. The selection objects or minima of the consecutive chains are numbered: min(i) is the selection object of chain (i); the length of this chain (in the number of objects) is —s(i)—; in the $i^{th}$ step of the algorithm the variables of the $(i+1)^{th}$ chain are considered as new data. In considering chain (o), L(o) is made equal to —s(o)—, and L(i) is the aggregated length (sum of the lengths in numbers of objects) of the chains already incorporated in the relevant sub-file to be formed. This incorporation is provisional and can be revoked. The variable Min(o) is infinite. This is the parameter value of the smallest rejected selection element of which it is therefore known at that moment that the related chain will certainly not be able to supply any object for the relevant sub-file. The variable Max(o) is equal to min(o). Max(i) is the parameter value of the largest accepted selection element, hence the largest selection element which according to the data then available may have any object in its chain which may form part of the sub-file. The variable m(o) is taken equal to 1. This is the multiplicity of Min(o); hence the number of selection objects with the same parameter value Min(o).

The procedure now contains the following parts:

1. The chains are formed; this is discussed on the basis of FIG. 6b.

2. In this respect, the selection object for each chain is retained, as well as the number of objects of which the chain consists. If necessary, over-long chains can be broken by defining additional selection objects, for example, if the length of a chain exceeds a fixed value during formation. The point is that over-long chains have frequently proved to be disadvantageous because the objects in them are distributed over many different sub-files and, in fact, the capacity of the sorting machine is only very partially used.

3. Next, the highest parameter value of the permissible selection objects for the sub-file currently to be formed and also the minimal parameter value of the non-permissible selection objects are determined as follows. Initially, the latter value is set to infinity. In block 52 it is detected whether another following selection object in a chain exists. If so, the relevant selection object is called up (block 54) and the variable min(i+1) is given the parameter value of this; the variable s(i+1) becomes the length of the relevant chain. In block 56 it is detected whether the relevant parameter value is small enough. If that is not the case (N), Min(i+1) is assigned in block 58: the smallest rejected object remains the same. If min(i+1) =Min(i), then the multiplicity of the lowest rejected selection object is incremented by 1. The system then goes back to block 52. If the result in block 52 is negative (N), the procedure of FIG. 6a stops and the system changes over (block 60) to filling the aforementioned direct sorting machine using the prevailing values of the variables Min, Max, L and m.

If the result in block 56 is affirmative (Y), the system goes to block 62: the incoming selection object has a parameter value smaller than that of the lowest rejected selection object. It is now detected whether the sum of the lengths of the chains which belong to the accepted selection objects, plus the chain length belonging to the newly considered selection object, fits into the sorting machine, i.e., is not greater than L (in fact L is frequently one greater than the internal storage capacity of the sorting machine, but that is not an essential point). If the result is affirmative (Y) the system goes to block 64. The newly considered selection object is accepted into this and is sorted with (any) earlier accepted selection objects (SOR). The definition of this sorting is as follows: produce a list consisting of the elements in the existing list and sort these with the newly accepted selection object min(i+1) in such a way that the largest selection object comes first and each subsequent selection object is no greater than the preceding selection object. The first selection object in this list Max(i+1) now becomes max(Max(i), min(i+1)), and if min(i+1)<Max(i) the first selection object on this list remains unchanged. The minimum of the rejected selection objects remains the same. The aggregated length of the chains is updated. The system then goes back to block 52.

If the result in block 62 is negative (N) then the unquestioning acceptance of the new chain would lead to an overflow condition for the sorting machine. For this reason it is detected in block 66 whether the newly considered selection object is at least equal to the maximum of the accepted selection objects. If the result is affirmative the system goes to block 68. The minimum of the rejected selection objects then becomes equal to the newly considered selection object, with the multiplicity of 1. The maximum of the accepted selection object remains unchanged. The aggregated chain length belonging to the accepted selection object remains unchanged. The system then goes back to block 52.

If the result in block 66 is negative then the system goes to block 70. There the operation "sort" already discussed in block 64 is performed first.

Next, the operation "eliminate" (ELIM) is performed which is necessary because the aggregated length of the chains then certainly does not fit into the direct sorting machine. The definition of this operation "eliminate" is as follows: produce from the existing list (formed in the operation "sort") a new list by continually omitting the maximum selection object from the lift until the aggregated length of the remaining chains fits into the direct sorting machine. If the elimination is successful, the maximum of the accepted selection objects will be equal to the remaining maximum selection object in the list after the elimination. The selection object eliminated from the list now becomes the minimal selection object of the rejected selection objects. The multiplicity of the rejected selection object now becomes equal to the multiplicity of the minimal eliminated selection object (this is at most equal to the total number of eliminated selection objects, but less is also possible). The aggregated length now becomes equal to that of the non-eliminated chains. The system then goes back to block 52.

The general procedure for filling the direct sorting machine is not as follows: detect whether the aggregated lengths of the chains belonging to the accepted selection objects, plus the multiplicity of the smallest rejected selection object, is not higher than the capacity of the sorting machine, and then all the selection objects which are not greater than the smallest rejected selection object are transported to the sorting machine which has sufficient capacity for the purpose. It has been found that this cut-off criterion is more advantageous than another, equally applicable, one, which makes the maximum of the accepted selection objects a criterion. This advantage can be evaluated from computer simulations. If, using the strategy now employed, the calculated sum is greater than the capacity, then the cut-off criterion (=limit) becomes: all the selection objects smaller than the smallest rejected selection object are transported to the sorting machine. This overshoot can occur relatively seldom; in fact, only when the aggregated length of the chains belonging to the accepted selection objects is equal to L and the multiplicity of the smallest rejected selection object is equal to 2 or more, if the aggregated length is equal to L−1 and the multiplicity is at least 3, and so on. And even if this latter condition applies, the capacity of the sorting machine need not always prove inadequate. It is pointed out that there is no selection object between the largest accepted selection object and the smallest rejected selection object. There may, however, be other objects between the largest accepted minimum and the smallest rejected minimum. Auxiliary variables for filling the direct sorting machine are determined with the above.

A flow diagram for determining the selection objects and related chain lengths is given in FIG. 6b. In fact, this procedure precedes that in FIG. 6a. In FIG. 6b, block 80 is the starting block. In it, the first element a(0) is called up. In this, the length of the current chain is set to 1: s(0)=1. In addition, a variable f(o) is assigned which indicates the increasing or decreasing direction of the current chain. After the first element in the current chain, this is, in any event, still undetermined. It is only known when two objects with differing parameter values of the chain are found. The chain length s(j) is always allocated to the selection object last found, namely in blocks 92, 98 and 104. In the event of an increasing chain the selection object is therefore the first object and in the event of a decreasing chain it is the last object. The flag f(j) has the value f=0 in the case of a decreasing chain and f=1 in the case of an increasing chain. When a whole chain has been found, f(j=1) for the next chain is again set to the position "undetermined". When considering a new object, the value of j is incremented. Here, the variables s(j) and f(j) are disregarded after processing and are replaced by new variables s(j+1) and f(j+1), respectively.

In block 82 of FIG. 6b it is detected whether the collection has a next object (NXT?). If the result is negative (N) the chain length size is fixed at its current value in block 104. If the chain is decreasing or horizontal, the current object also becomes the selection object. If this is not the case, the first object also remains the selection object. When this has been done, the system goes to block 50 in FIG. 6a. It is pointed out that the length of a chain is always only known at the end if this terminates either in a natural way (the next object has a parameter value which conflicts with the increasing-/decreasing direction of the current chain) or breaks off because the chain length has become too great.

If the result in block 82 is affirmative the next object is called up from the collection in block 86 and it is detected in block 88 whether the value of the flag f(j) is "undetermined". If the result is affirmative (Y) it is detected in block 96 whether the length of the current chain s(j) is at least equal to a particular fraction $\beta$ of the capacity of the direct sorting machine. The value of $\beta$ is permanently set in advance, for example, $\beta=\frac{1}{2}$. As a result, over-long chains are broken; if s(j)>L, even the relevant single chain would not fit into the direct sorting machine. If the result in block 96 is affirmative, the selection object of the current chain is made equal to a(j) in block 98 and the chain length is fixed at the current value s(j). The chain length of the next chain is given the value 1 (just as in block 80); finally, the flag f(j+1) is set to the position "undetermined" for the next chain. The system then goes back to block 82. If the result in block 96 is negative (N) the system goes to block 100, in which the chain length is incremented. The system then goes to block 102, in which the relation between the new object a(j+1) and the previous object a(j) is examined. If the new object is equal to the old one, the value of the flag f(j+1) is equal to the value of the flag f(j): undetermined (block 108). If the new object is smaller than the old one, the flag f(j+1) becomes equal to 0 in block 106: the chain is then decreasing. If the new object is greater than the old one, the flag f(j+1) becomes equal to 1 in block 110. The chain is then increasing. In addition, in block 110 the selection object of the current chain becomes min=a(j). After going through one of the blocks 106, 108, and 110, the system goes back to block 82 in order to call up a new object (if possible).

If the flag f(j) was already determined at 0 or 1 in block 88 (output N) the system then goes to block 90. There the conditions indicated in FIG. 6c are tested. These conditions are alternatives to each other. If condition (1) is valid, the system goes to block 92. The first line of condition (1) means that an increasing chain is followed by a lower object. The second line means that a decreasing chain is followed by a higher object. The third line means that the chain length exceeds the permissible limit. In all these three cases the chain must be broken and a new chain must be made. This means that similar operations are carried out as in block 98. If f(j)=1 (increasing chain), however, the selection object remains unchanged as the first object of the current chain.

If the condition (2) is valid in block 90 (i.e. the condition (1) is non-valid), the system goes to block 94. The first line of condition (2) means that a decreasing chain is continued with an object, the parameter value of which is at most equal to that of its predecessor. The second line of condition (2) means that an increasing chain is continued with an object, the parameter value of which is at least equal to that of its predecessor. One of these two lines must then still be combined with the condition that the chain length does not exceed the permissible limit. If this condition (2) is satisfied, the chain need not be broken and the system goes to block 94. In this, the chain length is incremented s(j+1)=s(j)+1, and the value of the flag f(j) is maintained. The system then goes back to block 82 and FIGS. 6a, 6b and 6c have been described.

Figure 7:
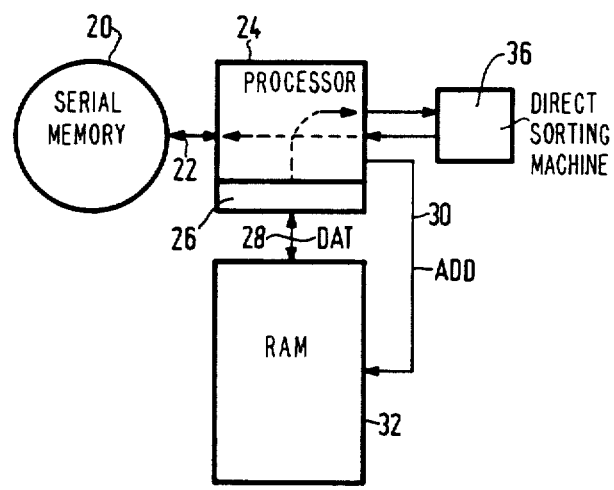
FIG. 7 gives a schematic representation of a device for performing the sorting operation.

FIG. 7 shows a block diagram of a device according to the invention. The input file is stored in a serial memory 20, for example, a magnetic disc memory. This communicates via line 22 with processor 24. Processor 24 communicates with memory 32 (RAM) via address line 30 and data line 28 by means of (among other things) data register 26. The processor, serial memory 20, and memory 32 may be of the normal construction and therefore require only a brief explanation. In the chain formation procedure successive objects are read out non-destructively. After this, the necessary variables are known for all chains. In the inspection procedure, a second serial scanning of the objects takes place. After this, the minimal rejected selection object is known and, in addition, it is certainly true that the number of objects with a parameter value smaller than or equal to that of the smallest rejected selection object fits into the capacity of the direct sorting machine 36. This latter number of objects is transported to the direct sorting machine 36, which can be combined with the next chain formation phase. The output result of the direct sorting operation in device 36 can, in turn, be stored in memory 20. The concatenation of the sub-files is a serial operation and no further processing capacity is therefore required. Needless to say, in the serial read-out, serial regrouping of the information can also take place in the serial memory. Reading and writing back can take place in the known manner.

What is claimed is:

1. A method for sorting a plurality of objects into an output file according to a parameter associated with each object, said objects being successively presented in an input file and said sorting taking place by presenting the objects to a direct sorting machine which offers space for a sub-file of at least a predetermined number of objects, comprising the steps of:

(a) in a chain-formation phase, comparing the parameter of an object with the parameter of a preceding object and forming a plurality of chains of objects monotonically varying parameters storing the number of objects in each chain and the parameter of a selection object of the chain;

(b) in an inspection phase, selecting (k) selection objects such that the objects of the number of chains belonging to these k selection objects is less than said predetermined number of objects;

(c) storing the parameter of the $(k+1)^{th}$ selection object;

(d) forming a sub-file consisting of the objects which based on their parameters, should appear in the output file not later than the said $(k+1)^{th}$ selection object;

(e) directly sorting the sub-file;

(f) repeating steps a-e until all objects are sorted into sub-files; and (g) concatinating the sub-files.

2. A method according to claim 1, characterized in that after a first inspection phase a following chain formation phase is performed simultaneously with the formation of a sub-file based on a directly preceding phase.

3. A method according to claim 1, in which the forming of a chain is terminated on reaching a chain length which is a fixed fraction of said predetermined number of objects.

4. Apparatus for sorting a plurality of objects into an output file, according to a parameter associated with each object, said objects being successively presented in an input file comprising:

direct sorting means for sorting a sub-file of at least a predetermined number of objects;

chain formation means for successively comparing the parameter of an object from the input file with the parameter of a preceding object and forming a plurality of chains of objects having monotonically varying parameters;

memory means for storing the number of objects in each chain and the parameter of a selection object of the chain;

inspection means for selecting (k) selection objects such that the number of objects in the chains belonging to these (k) selection objects, is less than said predetermined number of objects;

means for storing the parameter of the $(k+1)^{th}$ selection object;

means for forming a sub-file consisting of the objects which, based on their parameters, should appear in the output file not later than the said $(k+1)^{th}$ selection object;

means for inputting the sub-file to said direct sorting means;

control means for repeatedly actuating said chain forming means, said inspection means, said means for storing the parameter of the $(k+1)^{th}$ selection object, and the means for forming a sub-file until all objects are sorted into sub-files; and means for concatinating the sub-files into the output file.

* * * * *